P. McMACKIN.
Sewer-Pipe.
No. 215,947.  Patented May 27, 1879.
Fig. I.
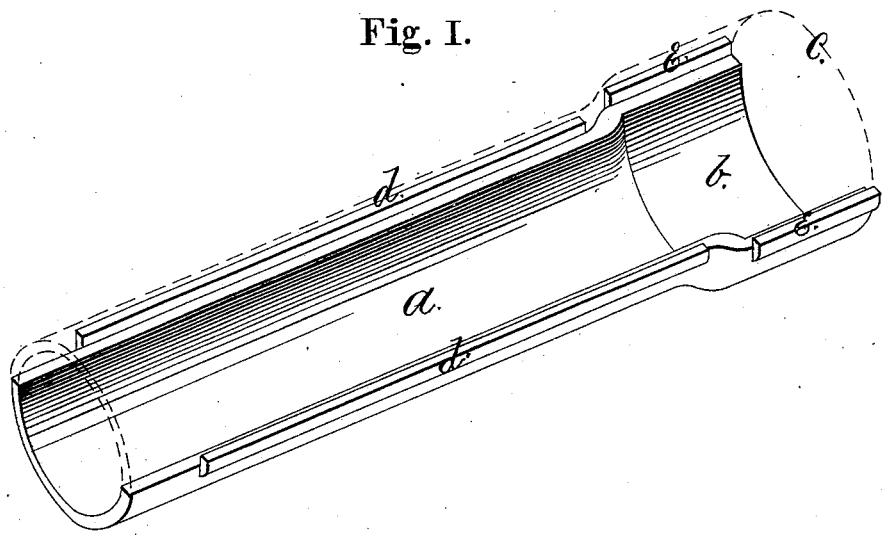
Fig. 2.
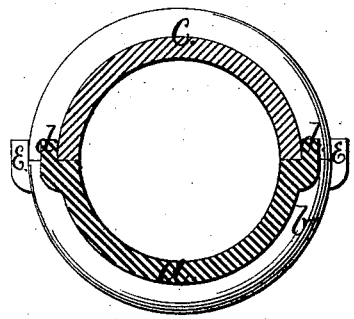
WITNESSES:
Joseph A. Miller Jr.
William L. Coy.
INVENTOR:
Peter McMackin
by Joseph A. Miller
Attorney

UNITED STATES PATENT OFFICE.

PETER McMACKIN, OF LONSDALE, RHODE ISLAND.

IMPROVEMENT IN SEWER-PIPES.

Specification forming part of Letters Patent No. 215,947, dated May 27, 1879; application filed April 4, 1879.

*To all whom it may concern:*

Be it known that I, PETER MCMACKIN, of Lonsdale, in the county of Providence, State of Rhode Island, have invented new and useful Improvements in Sewer-Pipes; and I hereby declare that the following is a full, clear, and exact description of the same, which will enable others versed in the art to make and use the same, reference being had to the accompanying drawings, forming part of this specification.

This invention has reference to pipes laid in the ground and used to carry the sewage from the closet of the house or other building to the sewer; and consists in the peculiar manner of constructing such pipes in two halves, having projections longitudinally thereon, with a vacant space between that on the main stem and on the flanged portion, arranged so that when laid they form an efficient whole, as will be more fully set forth hereinafter, and pointed out in the claim.

Figure 1 is a perspective view of the pipe, the lower half being shown in solid and the upper half in broken lines. Fig. 2 is a cross-section of the same.

In the drawings, *a* represents the lower half of the improved pipe, and *b* the socket end of the same. C represents the upper half of the pipe. *d* are projections formed along the joint of the pipe, extending from a point near the end of the pipe which enters the socket to the socket on the pipe, and form rabbets, between which the upper half is laid. E are projections on the sides of the socket, to also form a rabbet and cover the joint.

There is a break or vacant space in the projection *d* on the stem of the pipe, and E on the flange portion, for the purpose of allowing the water in the surrounding earth to percolate into the pipe when used as soil or drain pipe.

The joint in this pipe may be made water-tight by some cheap friable cement or clay; or it may be laid without such a cemented joint, as the same is usually covered with soil. Such improved pipe is not liable to be broken by frost, which is the case with all solid pipes when not laid deep enough to be protected against frost; and in many, even in most situations, such pipes, for part of their length, are exposed to frost, and when bursted the defect is not discovered for some time, and the sewage filtering into the soil causes fever, diphtheria, and other frequently fatal maladies.

When a portion of my improved pipe is exposed to frost the two halves will give sufficient to allow for the expansion in freezing, and when thawed they resume their original position without injury.

Pipes constructed in this manner can be made lighter and cheaper, whether they are made of metal or clay or other material, and portions of such pipes can be exposed, the upper half raised, and the drains examined without disturbing the lower portion of the pipe, and thus saving cost in relaying.

These pipes may be made of any desired diameter or length, and if of cast-iron can be cast without cores, and much cheaper than other pipe. They may be made with branches, and the pipes made to form bends, elbows, or U-shaped sections.

Having thus described my invention, I claim as new and desire to secure by Letters Patent—

The combination of the section *a*, having a socket, *b*, and projections *d* and E, with the other section, C, to form a sewage-pipe, substantially as and for the purpose described.

PETER McMACKIN.

Witnesses:
JOSEPH A. MILLER,
JOSEPH A. MILLER, Jr.